May 24, 1960  R. F. ALLYNE  2,937,510
APPARATUS FOR CONTROLLING THE TEMPERATURE
OF TRAILER CARGO AND THE LIKE
Filed May 26, 1958  2 Sheets-Sheet 1
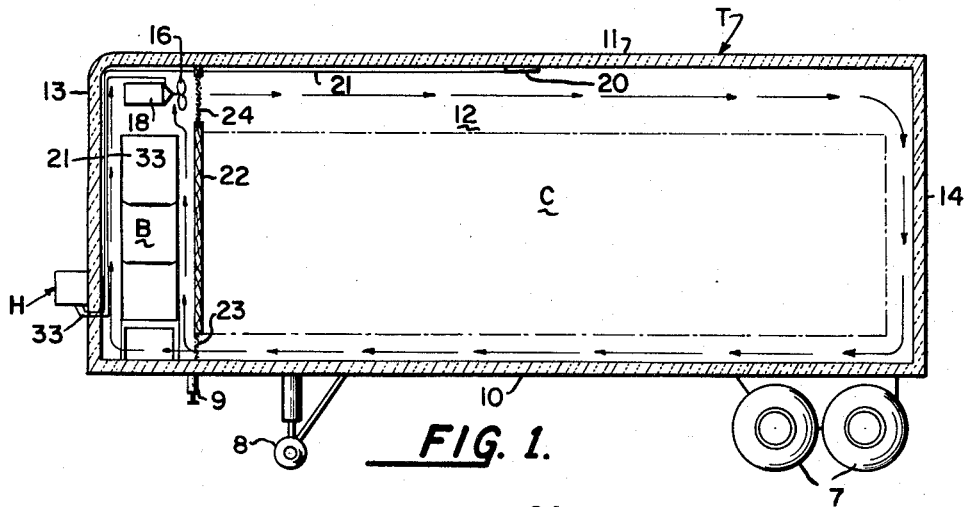
FIG. 1.
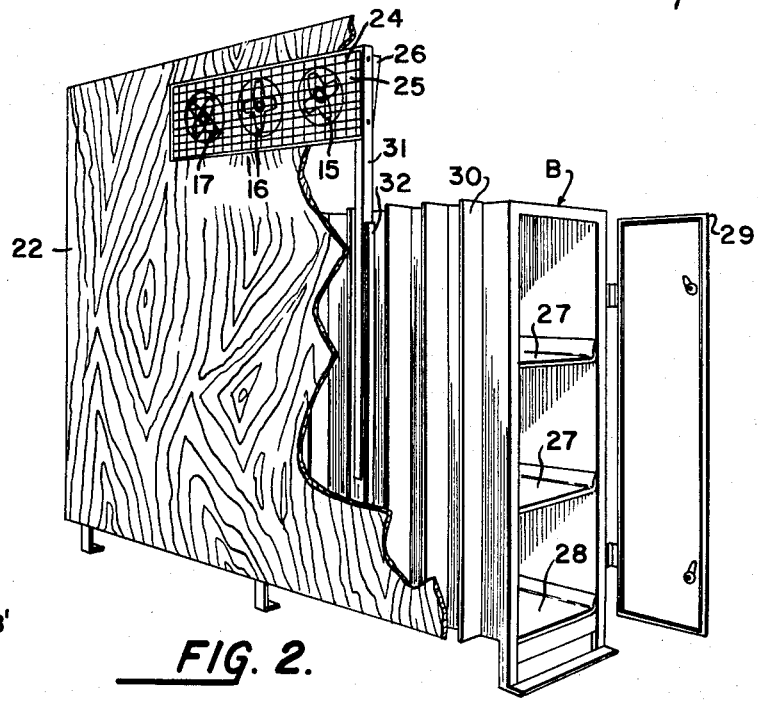
FIG. 2.
FIG. 3.
INVENTOR.
ROLLIN F. ALLYNE
BY
Horace B. Van Valkenburgh
ATTORNEY

INVENTOR.
ROLLIN F. ALLYNE
BY
ATTORNEY

United States Patent Office 2,937,510
Patented May 24, 1960

2,937,510

APPARATUS FOR CONTROLLING THE TEMPERATURE OF TRAILER CARGO AND THE LIKE

Rollin F. Allyne, 533 Kensington Ave., La Grange, Ill.

Filed May 26, 1958, Ser. No. 737,760

8 Claims. (Cl. 62—186)

This invention relates to apparatus for controlling the temperature of trailer cargo and the like, particularly useful in a trailer in which is installed a refrigeration unit adapted to contain solid carbon dioxide or Dry Ice. The present invention is an improvement upon the apparatus of my U.S. Patent No. 2,731,807 of January 24, 1956.

In my aforesaid U.S. Patent No. 2,731,807, there is disclosed and claimed a method of controlling the temperature of trailer cargo and the like, in which air is drawn from the lower portion of the cargo space and upwardly through an air cooling space, discharged to the upper portion of the cargo space to cool the cargo and passes to the lower portion of the cargo space, then back to the cooling space, the impulse to the air when no cooling is needed being reduced to a value which is just sufficient to prevent a backflow of cold air from the air cooling space to the lower portion of the cargo. In the apparatus disclosed and claimed therein, the air cooling space may be occupied by a bunker adapted to contain Dry Ice and the above air circulation may be effected by a blower or one or more fans which are preferably mounted atop the bunker and preferably all of which are operated at low speed, as through a resistance, when no cooling is called for, but are operated at full speed when cooling is called for. In the circuit controlling the fan or blower, a single pole, single throw switch is used in connection with a thermostat. However, it has been found that, while the apparatus of this patent operates very successfully, the ampere requirements of a single blower of proper size for large or medium size trailers, in addition to ampere requirements of conventional electrical equipment, exceeds the capacity of the average tractor generating system when operating at high speed on the cooling cycle, it thus being necessary to install a separate generating set on the trailer. However, the initial cost, weight and maintenance of a separate motor and generator set is such that the apparatus is placed at an economic disadvantage.

It has also been found that a multi fan assembly can be utilized whose pressure characteristic will not equal that of the above single blower, but whose volume of air circulated throughout the cargo section meets minimum circulation requirements and whose combined ampere requirement at high speed on the cooling cycle does not exceed the capacity of the average tractor generating system, even including ampere requirements of conventional electrical equipment. Thus, the need of a separate generating set on the trailer may be eliminated and a multi fan means for circulating air to the cargo section is preferable. However, a new problem was introduced when attempting to employ the two speed fan method of temperature control disclosed in my U.S. Patent No. 2,731,807, in volving a single pole thermostat switch and a simultaneous reduction in speed of all fans employed during the off cycle. To cause interruption of refrigeration in the cargo section and to proclude discharge at ceiling level in cargo section during the off cycle, it was necessary to operate the fans at an extremely slow speed, to the extent that the fan motors would not start moving, in every instance, when the unit was turned on at a time when the thermostat was not calling for refrigeration. The relatively high resistance value, necessary to cause the extreme slow fan speed, reduced starting torque of motor to a hair line condition where some motors would not start in every instance from a standstill, when the thermostate was not calling for refrigeration. This non-reliability of starting from standstill is commercially impractical. For instance, the specific operating characteristics of a typical multi fan means involving a single pole thermostat and conventional 12 volt D.C. or A.C. current when the thermostat calls for refrigeration, the fans operate at about 2200 r.p.m., but when the thermostat does not call for refrigeration, the fans must be reduced to about 150 r.p.m. The resistance value corresponding to 150 r.p.m. is about 10 ohms. The solution to this problem and the improvement constituting the present invention is the employment of a double pole thermostat switch or the equivalent thereof, in conjunction with a multi fan means of effecting air circulation, such that only one fan operates at a reduced speed during the off cycle. This one fan may operate at about 700 r.p.m. to accomplish the same results as all fans did, as described above, operating at 150 r.p.m. The lower resistance, i.e., about 4½ ohms, creates increased starting torque in this one motor to assure its starting from standstill. This reliability is commercially practical.

Among the objects of the present invention are to provide an improvement on the apparatus for controlling the temperature of trailer cargo and the like, of my U.S. Patent No. 2,731,807; to provide such apparatus which permits a plurality of fans to be operated from a conventional truck battery; to provide such apparatus which permits a plurality of fans to be operated reliably under all conditions; and to provide such apparatus which will be efficient and effective in operation.

The foregoing and additional objects of this invention, as well as the novel features thereof, will become apparent from the description which follows, taken in connection with the accompanying drawings, in which:

Fig. 1 is a partly diagrammatic, longitudinal vertical section of a refrigerated trailer in which is installed apparatus constructed in accordance with this invention;

Fig. 2 is a perspective view, on an enlarged scale, of a bunker, bulkhead and fan units installed within the trailer of Fig. 1;

Fig. 3 is a fragmentary side elevation showing the upper portion of a fan motor and support therefor of Fig. 2;

Figure 4:
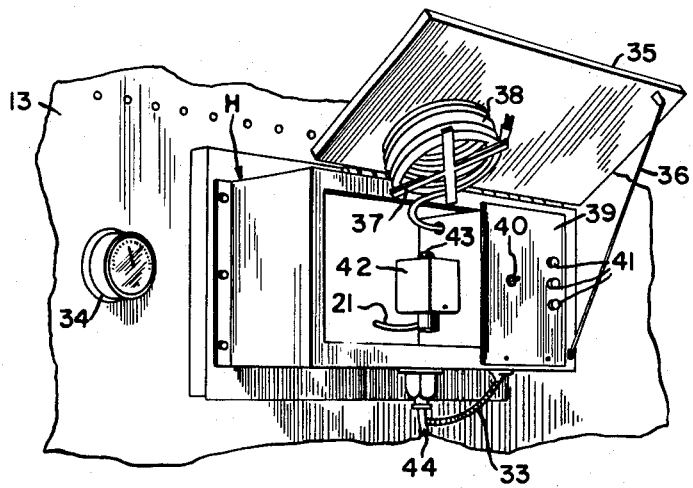
Fig. 4 is a fragmentary perspective view illustrating a nose housing, in open position, installed on the front or nose of the trailer of Fig. 1 and containing a portion of the apparatus.

As in Figs. 1 and 2, apparatus constructed in accordance with this invention may be installed in a trailer T having conventional rear wheels 7, a jack wheel 8 for supporting the front end of the trailer when the trailer is disconnected from the tractor and a king pin 9 for connection to the tractor. The trailer T is also provided with an insulated floor 10, roof 11, side walls 12, front wall 13 and rear wall 14, the latter being provided in a conventional manner with rear doors which may be opened for placement or removal of the cargo C. The cargo should be supported above the floor 10, within the space indicated by the dot-dash lines, so that cooled air may be circulated about the cargo, along the path indicated by the arrows, i.e., along the top of the cargo, then downwardly along the sides and the rear of the cargo, then forwardly underneath the cargo, then upwardly past a Dry Ice bunker B, with the path being repeated by the means of circulating fans 15, 16 and 17. The fans may be driven by suitable motors, such as motor 18 of Fig. 1 or motor 18' of Fig. 3, when cooling is called for, as determined by a thermostat bulb 20, preferably a cross ambient type of bulb. Bulb 20 is conveniently mounted centrally of the trailer with respect to the front 13 and rear 14 and connected by a conventional expansion tube 21 with a control device in a nose housing H, installed on the front of the front wall 13. When cooling is not called for, one of the fans, such as the central fan 16, is operated at a relatively low speed and the remaining fans, such as fans 15 and 17, are stopped, so that the low speed of the fan 16 will cause air merely to hang within the bunker and perhaps circulate outwardly from fan 16 and then inwardly through the stopped fans 15 and 17, to prevent any back flow of air from buuker B, downwardly to the cargo C, particularly the lower front portion of the cargo, thus resulting in the desired interruption of refrigeration in the cargo section during the off cycle.

The cargo space is conveniently separated from the bunker B by a bulkhead 22, as of plywood, which is spaced from the floor 10 to permit the circulation of air indicated by the arrows, this opening conveniently being provided with a screen 23 while a similar screen 24, shown also in Fig. 2, may be installed in the opening in bulkhead 22 through which the fans 15, 16 and 17 discharge. Conveniently, a plate 25, having a circular aperture for each of the fans, is installed behind the screen 24, while rearwardly of plate 25 a fan and motor support 26, as in Figs. 2 and 3, may be installed, the support 26 having triangular ends or being otherwise suitably constructed so that the axis of each fan and each fan motor, such as motor 18' of Fig. 3, will be slanted upwardly, so that air will be discharged slightly upwardly into the upper portion of the trailer above the cargo. The bunker B may be constructed in the manner of my U.S. Patent No. 2,731,807 and include shelves 27 on which, as well as on bottom 28 of the bunker, Dry Ice cakes may be placed, access thereto being obtained through a door 29, shown in open position in Fig. 2. The front and rear walls of the bunker B, as well as the end opposite the door 29, may be provided with fins 30 to increase the rate of heat exchange and cooling of the air passing upwardly at the front and rear of the bunker and the end opposite door 29. The motor and fan assembly may be mounted on an upright support 31 at each end, such as angles mounted on the rear wall of bunker B, as by attachment of each angle support 31 to an angle 32, in turn attached to the rear wall of the bunker. Each motor which drives one of the fans 15, 16 or 17 may be connected by wires extending through an electrical cable 33 which may follow the contour of the inside of the trailer from the fan motors to a lower position on the front wall 13, then through the same and to the nose housing H. A dial thermometer 34, as in Fig. 4, may be mounted on the front of the trailer adjacent nose housing H, to indicate the temperature inside the trailer.

As in Fig. 4, the nose housing H may be a box-shaped structure provided with a hinged front lid 35 adapted to be held in open position by a rod 36 and having mounted thereon a reel 37 carrying an electrical cable 38 for connection to a conventional 110 volt A.C. outlet, when the trailer is disconnected from the tractor and standby refrigeration is desired, such as when cooling the trailer down for initial loading, or maintaining the cargo cool prior to or during unloading. Within nose housing H, at one side, may be installed a control box 39, within which various electrical components may be installed and on the front panel of which may be mounted a three position switch 40 and a series of fuses 41. Adjacent control box 39 may be installed a thermostat control 42 having an adjusting knob 43, for adjusting the response of the thermostat to the temperature within the trailer at bulb 20 of Fig. 1, such as to any temperature between —5° F. and 60° F., so that cooling will be called for in the event that the temperature rises to the upper control limit. A cable 44, for connection to the battery of the tractor which draws the trailer, may extend from the under side of the nose housing H.

Figure 5:
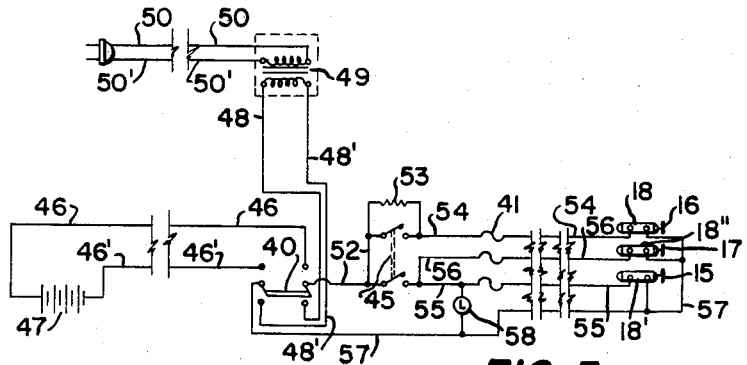
Fig. 5 is a wiring diagram of a three-fan unit.
Figure 6:
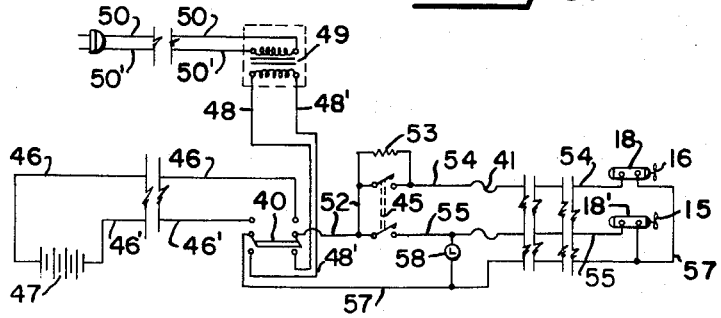
Fig. 6 is a wiring diagram of a two-fan unit.

In accordance with the present invention, the control circuit for a plurality of fans for use in apparatus constructed generally in accordance with my U.S. Patent No. 2,731,807, includes a double pole, single throw thermostatically operated switch 45, shown in each of the electrical diagrams of Figs. 5 and 6, that of Fig. 5 including the three fans 15, 16 and 17 of Fig. 2 and the respective motors 18', 18 and 18" therefor, it being noted that to simplify the wiring diagram the motor 18 and fan 16 are shown on the outside of the set of three, but that motor 18 and fan 16 will ordinarily be located in the center, although the low speed motor and fan may be on the outside of the set, if desired. As in each of Figs. 5 and 6, the two leads 46 and 46', within the battery cable 44 of Fig. 4, extend from the tractor battery 47 to the three positions switch 40, which may be operated by the knob shown in Fig. 4 and is preferably a conventional toggle type switch, but is shown diagrammatically in Figs. 5 and 6 as a knife edge switch for clarity of illustration. Thus, the switch 40 has three positions, i.e., an "up" position in which the fan motor circuit is connected to the leads from batery 47, a central or "off" position, and a "down" position in which the fan motor circuit is connected by wires 48 and 48' to the secondary of a transformer 49, the primary of transformer 49 being connected by wires 50 and 50' in cable 38 of Fig. 4, to a conventional 110 volt A.C. outlet, when appropriate.

From one center terminal of switch 40, a wire 52 leads to both poles of the double pole thermostat switch 45 and then to a resistor 53, the opposite therminal of which is connected to a wire 54, which leads from the opposite terminal of one pole of switch 45 through one of the fuses 41, to motor 18 for fan 16. From the corresponding terminal of the opposite pole of switch 45, a wire 55 leads to motor 18' for fan 15, again through a fuse 41. In Fig. 5, a wire 56 is connected to wire 55 and leads, through a fuse 41, to one terminal of motor 18" for fan 17. From the opposite center terminal of switch 40, a wire 57, including necessary branch wires, leads to the opposite terminals of the motors 18, 18' and 18" of Fig. 5, or the motors 18 and 18' of Fig. 6, while a light 58 may be installed across wires 55 and 57, to indicate that cooling is being effected.

As will be evident, when switch 40 is connected, either to the battery 47 or to the transformer 49 with cable 38 plugged in, current will be supplied to wires 52 and 57. If no cooling is called for, the double pole thermostat switch 45 will be open, as in the position shown in Figs. 5 and 6, so that motor 18 for fan 16 will draw current through resistor 53 and thereby operate at a relatively low speed. As will be evident, resistor 53 should have a suitable value, so that the motor 18 will operate at a desired speed, which will be discussed later. When cooling is called for, the double pole switch 40 is closed by the thermostat and each of the motors 18, 18' and 18" of Fig. 5, or 18 and 18' of Fig. 6, will be brought up to full speed, with each of the fans 15, 16 and 17 then moving air at the maximum rate.

As indicated previously, if a single blower and motor is utilized, the motor would draw too heavy a current for the battery 47 of the usual tractor unit, so that a separate electrical generating system, mounted on the trailer, is necessary. Also, if two or more fans are operated by smaller motors, but a single pole thermostat switch is used, so that all of the fans will be operated at reduced speed during "off" cooling periods, the speed of the fans must be reduced to such a low speed that they sometimes may not start if the apparatus is started when no cooling is called for. For instance, assuming that a two or three fan unit is used and the full speed of the motors is 2200 r.p.m., in order to produce the desired movement of air when no cooling is called for, i.e., so as to cause air to hang around the bunker B and produce no circulation to the cargo, each of these fans must be reduced to a speed which, in several installations, has been found to be 150 r.p.m. However, when two or more fans, such as three, are used, and only one fan is maintained at a reduced speed during off periods, with the remaining fans being motionless, what may be termed the off period fan may be operated a speed of, say, 450 to 750 r.p.m., such as 700 r.p.m. For this more medium speed, the motor for this single fan will start readily if the apparatus is started when no cooling is called for. It will thus be evident that the apparatus of this invention requires not only the double pole, single throw thermostatic switch 45, or the equivalent thereof, but also that only one fan be operated at a low medium speed and the remaining fans be motionless during off periods of the cooling cycle.

From the foregoing, it will be evident that the apparatus of this invention fulfills to a marked degree the requirements and objects hereinbefore set forth. By the use of a plurality of fans and motors for driving the same, with only one fan operating at a lower medium speed during off periods of the cooling cycle, rather than all fans operating at a very low reduced speed, reliability in starting is assured, irrespective of whether the cooling cycle is in an "on" or "off" period when the apparatus is started. The double pole thermostatic switch permits one fan motor to be operated at a reduced speed during off periods of the cooling cycle and at its full speed during the on periods of the cooling cycle, with the remaining fan motors coming to a standstill during off periods of the cooling cycle, and operating at full speed during on periods of the cooling cycle. With one or two fans motionless, the fan moving during "off" periods can also recirculate air through the motionless fans, so that the moving fan can be operated at a higher speed than otherwise.

Although certain preferred embodiments of this invention have been illustrated and described, it will be understood that other embodiments may exist and that various other changes may be made, all without departing from the spirit and scope of this invention.

What is claimed is:

1. In apparatus for controlling the temperature of trailer cargo and the like, including an air cooling space disposed above the lower portion of the cargo space; means in said cooling space for cooling air and including a refrigerant having a temperature lower than the lowest temperature to which said cargo is to be cooled; means responsive to the temperature of said cargo when said cargo requires cooling and when said cargo does not require cooling; and means controllable by said temperature responsive means for drawing air from the lower portion of said cargo space, upwardly through said cooling space and thence into the upper portion of said cargo space; the improvement comprising a plurality of individual air discharge means forming said air drawing means, one of said individual air discharge means being operable at a reduced speed to cause air generally merely to hang in said cooling space without flowing back into the lower portion of said cargo space when cooling of said cargo is not required, and all of said individual air discharge means being operable at full speed when cooling of said cargo is required; and means controlled by said temperature responsive means for operating said one air discharge means at said reduced speed when cooling of said cargo is not required and for operating all of said air discharge means at full speed when cooling of said cargo is required.

2. In apparatus as defined in claim 1, wherein said individual air discharge means comprises a plurality of fans disposed in generally adjacent relation; and an electric motor for driving each fan.

3. In apparatus as defined in claim 2, including means for suplying current to said fan motors, including a battery of a tractor for drawing said trailer.

4. In apparatus as defined in claim 2, wherein said temperature responsive means includes a thermostat bulb in said cargo space; and said means controlled by said temperature responsive means includes a double pole switch.

5. In apparatus as defined in claim 4, including current supply means having one side connected to the terminal at one side of said double pole switch; a first electrical wire leading from one of the opposite terminals of said switch to one terminal of the motor for one of said fans; a resistance connected between said terminals at one side of said switch and said first wire; a second wire leading from the other opposite terminal of said switch to one terminal of each of the remaining fan motors; and means connecting the other side of said current supply means to the opposite terminals of said fan motors.

6. In apparatus as defined in claim 5, wherein said fans and motors are two in number.

7. In apparatus as defined in claim 5, wherein said fans and motors are three in number.

8. In apparatus as defined in claim 5, wherein said current supply means includes a transformer; means for connecting said transformer to an alternating current outlet of a higher voltage than the battery of a tractor for drawing said trailer; and a switch for connecting said transformer in the circuit of said fan motors.

References Cited in the file of this patent

UNITED STATES PATENTS

| | | |
|---|---|---|
| 2,319,130 | Hanson | May 11, 1943 |
| 2,528,720 | Binder | Nov. 7, 1950 |
| 2,731,807 | Allyne | Jan. 24, 1956 |